April 27, 1965 P. T. FARNSWORTH 3,181,028
ION TRANSPORT VACUUM PUMP
Filed March 29, 1962 2 Sheets-Sheet 1

POTENTIAL DISTRIBUTION CURVE

ANODE VOLTAGE
ANODE CONE 16
ANODE CONE 17
ZERO VOLTS
LONGITUDINAL AXIS OF TUBE

Inventor:
Philo T. Farnsworth,
by Percy P. Santry
Attorney

April 27, 1965     P. T. FARNSWORTH     3,181,028
ION TRANSPORT VACUUM PUMP
Filed March 29, 1962     2 Sheets-Sheet 2
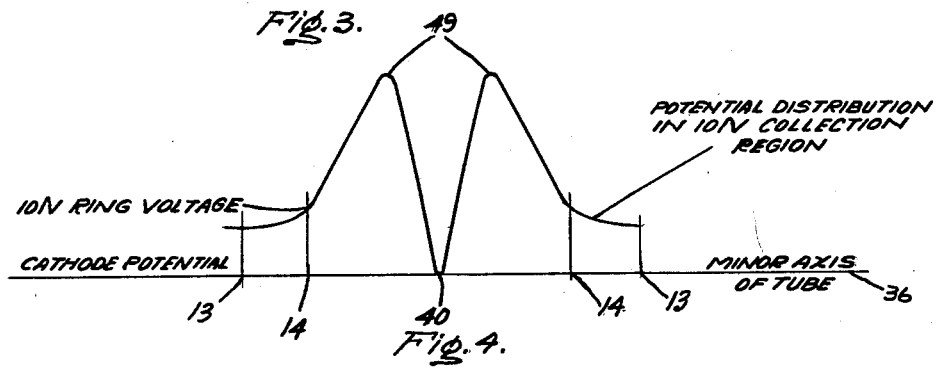
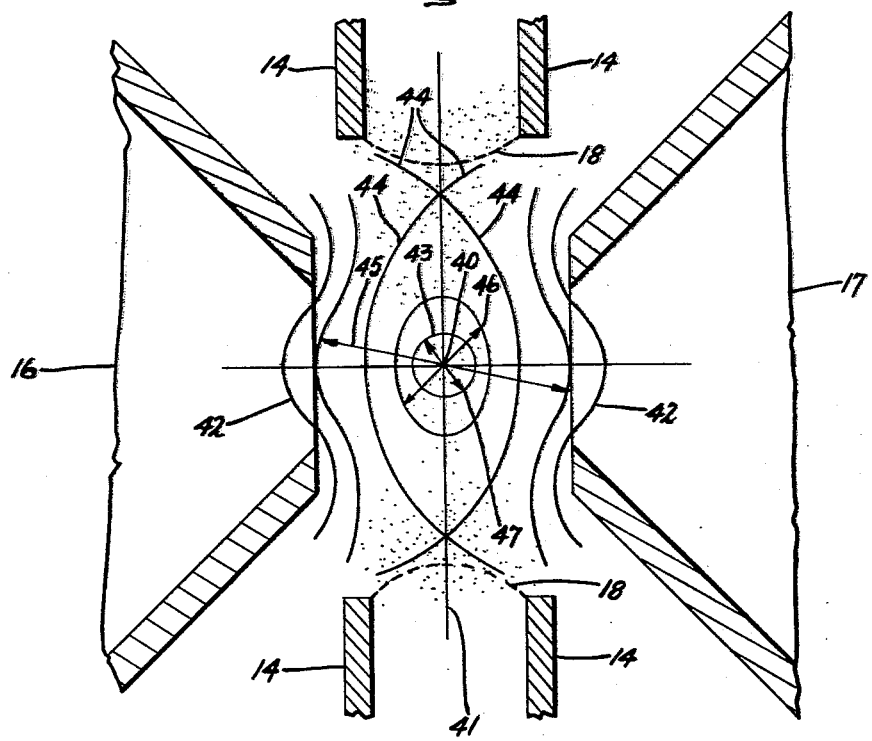
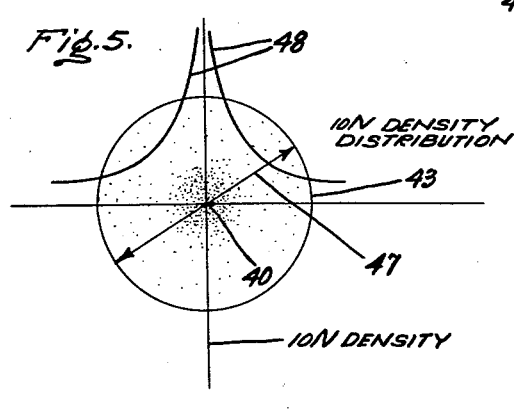
Inventor:
Philo T. Farnsworth,
by Percy P. Lantzy
Attorney

United States Patent Office 3,181,028
Patented Apr. 27, 1965

3,181,028
ION TRANSPORT VACUUM PUMP
Philo T. Farnsworth, Fort Wayne, Ind., assignor to International Telephone and Telegraph Corporation, Nutley, N.J., a corporation of Maryland
Filed Mar. 29, 1962, Ser. No. 183,440
16 Claims. (Cl. 315—108)

The present invention relates to a vacuum pump, and more particularly to an electron discharge device capable of collecting and scavenging gases from closed vessels.

In the prior art, two basic vacuum pumps are characterized as being of the diffusion and gettering type. The diffusion pump utilizes mercury or oil which is vaporized and passed through a jet nozzle which is surrounded by or in communication with a chamber connected to the vessel being evacuated. The vaporized mercury or oil flows through the nozzle as a high velocity stream with which molecules of gas from the aforesaid vessel are diffused and otherwise trapped. As this process continues and the vapor stream is recirculated, gas molecules are progressively diffused into the stream and thereby exhausted from the vessel.

In the gettering pump, the gas which is being exhausted is first ionized and a jet stream of ions is formed. These ions are removed from the stream by a gettering action which involves the entrapment thereof by a metal such as titanium. Thus, one primary difference between the diffusion and gettering pumps resides in the fact that in the gettering pump the jet stream itself is removed as fast as it is generated but in the diffusion pump the jet stream is recirculated to scavenge continuously the gas molecules being evacuated.

In this invention a new principle of pumping, characterized as "ion transport pumping," is utilized simultaneously along with the gettering and diffusion processes described in the foregoing. In "ion transport pumping" ions are first formed from neutral atoms and then transported by electric fields to a region, relatively remote from the point of formation, where the ions are allowed to become deionized and then removed by a conventional vacuum pump.

In evacuating a vessel, this invention utilizes the principles of ionization wherein gas in ionized form is continuously concentrated in a localized region from which it is scavenged. More specifically, the invention first ionizes the gas being evacuated, secondly concentrates this gas into a localized region by means of an electrical field, and thirdly continuously withdraws the gas from the concentrated region to permit additional gas to be collected and concentrated. The process is continuous and is capable of reducing pressure to an infinitesimal value of the order of $10^{-10}$ millimeters of mercury and lower.

The structure for accomplishing the foregoing utilizes an electron space charge in a Faraday space for creating an electrical field in a primary region which may be free of tangible structure, this electrical field having a potential distribution which varies from a minimum at a center to a maximum on an enclosing surface radially spaced outwardly from the center. The term "tangible structure" as used herein means mechanical structure and does not include gaseous particles such as electrons, ions, and neutral molecules. Gas from a vessel being evacuated which enters this primary region is ionized, and at the instant of ionization the ions travel toward the minimum potential center and pass therethrough onwardly to a point in the region which is of a potential which substantially equalizes the energy of the particular ion and returns it along its original path. The ions thus created thereby oscillate through the minimum potential point along diametral paths until such time as ionic collisions occur. Such ionic collisions in the vicinity of the minimum potential point involve the coulomb forces of repulsion which results in the approaching ions being deflected from each other in directions dependent upon the incident paths, this phenomenon being characterized in the art as scattering. Since some of the ions undergoing deflection will have energies imparted thereto which will propel them to the outermost portions of the primary region, it is possible to direct these deflected ions from the region by providing a second electrical field of lower potential surrounding the region through which the ions may fall. Once the ions have been completely withdrawn from the primary region into the secondary region of the second electrical field, they can be easily scavenged, for instance, by means of an ordinary rough vacuum pump coupled to the secondary region, or by directing them into a getter.

The invention itself may be considered as a high vacuum, electron discharge tube having an inlet port for connection to a vessel to be evacuated and an outlet port to be connected to a rough pump, gases from the vessel to be evacuated entering the inlet port and thereafter becoming ionized in the aforementioned primary region and thereafter withdrawn from the region to the rough pump as already explained. The electron discharge in the tube is utilized to create the necessary electrical field in the primary region while suitable electrodes surrounding this region are utilized for creating the secondary field and for withdrawing scattered ions from the primary region as the process continues.

It is therefore an object of this invention to provide a vacuum pump wherein an electron discharge is so controlled as to create an electrical field in a region free of tangible structure, which region concentrates ionic particles which scatter in such a manner that they can be withdrawn into a secondary region in a continuous process.

It is still another object of this invention to provide an electron discharge device capable of producing heavy concentrations of ions in a localized region from which ions may be withdrawn in a continuous process and thereafter effectively scavenged to reduce the number of gaseous particles in the device.

It is another object to provide an electronic vacuum pump which performs a pumping action through ionization but nevertheless continues to function even at the lowest pressures.

In the accomplishment of this invention there is provided a vacuum pump comprising means for establishing in an inner region of space free of tangible structure a potential distribution which is a minimum in the central portion thereof and a maximum on a surface surrounding said central portion, second means for establishing a second potential distribution contiguous with the aforementioned surface which progressively diminishes radially outwardly from said surface to a predetermined low value, and lastly means for scavenging ions from the outer region of said second potenital distribution whereby gaseous pressure may be reduced.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is another potential distribution curve used in explaining the operation of the invention;

FIG. 4 is a fragmentary diagrammatic illustration of a portion of the device of FIG. 1 illustrating certain operative features thereof; and FIG. 5 is a diagram illustrating ionic concentration in the central portion of the primary region.

Figure 1:
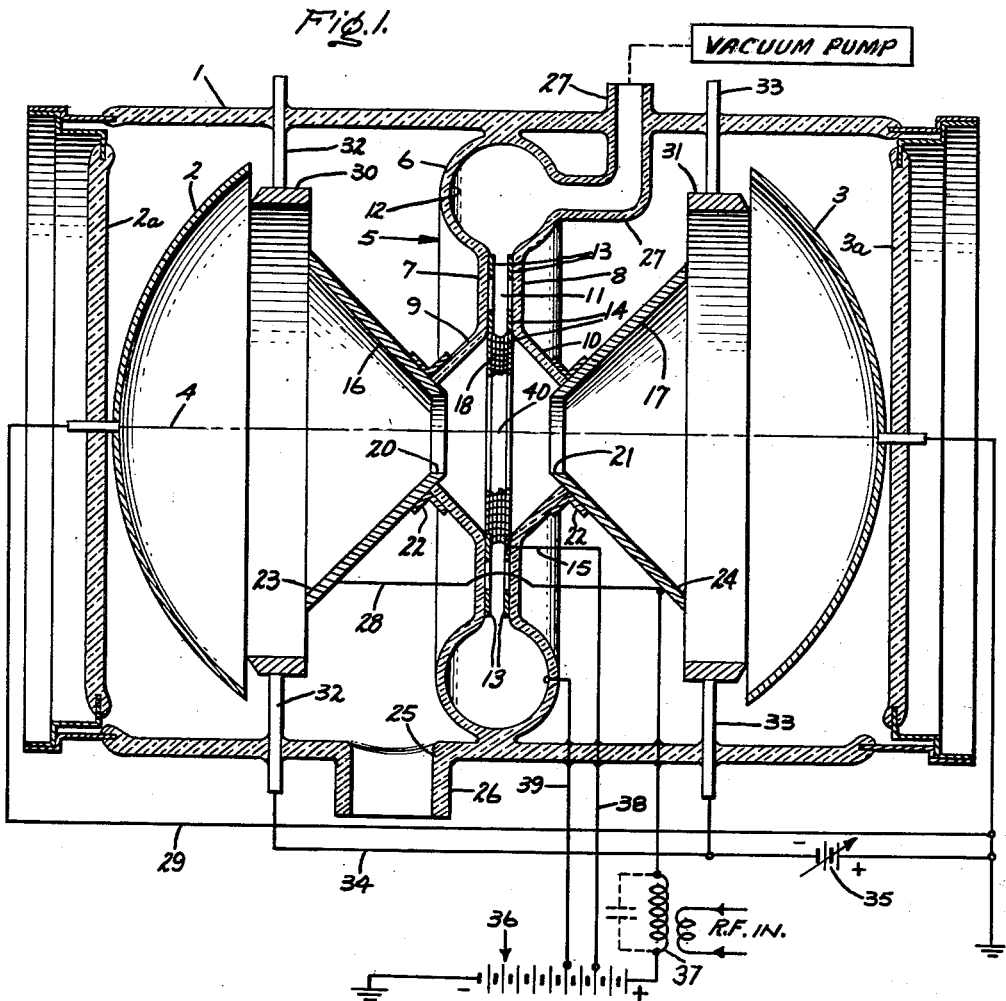
FIG. 1 is a longitudinal sectional illustration of one embodiment of this invention.

Referring to the drawings, and more particularly to FIG. 1, a hermetically sealed glass envelope 1 has fixedly mounted on the opposite ends 2a and 3a thereof two facing cathodes or dynodes 2 and 3 which are segments of spheres and which preferably are formed of some suitable secondary emissive material such as beryllium copper, stainless steel and the like. The structure thus far described is generally cylindrical in shape, being symmetrical about a longitudinal axis indicated by the reference numeral 4.

Coaxially secured inside the envelope 1 is an annular compartment member, generally indicated by the numeral 5, which is composed of an outer annular exhaust chamber 6, opposite, closely spaced and parallel side walls 7 and 8, and inner walls 9 and 10 which flare outwardly as shown. The side walls 7 and 8 define a relatively narrow annular passage 11 which opens into the exhaust chamber 6 and also into the space between the two walls 9 and 10. The entire compartment member 5 may be fabricated of glass or ceramic, or in the alternative the exhaust chamber 6 may be of conductive metal with the balance of the member 5 being glass or ceramic. If made entirely of glass, the inner surface 12 of the chamber 6 is coated with a conductive material such as carbon or stannous chloride. If the chamber 6 is formed of metal, this conductive coating would not need to be used.

Suitably secured to the inner surfaces of the two walls 7 and 8, by some means such as an adhesive or soldering to an evaporated coating of metal, are two pairs of rings or electrodes 13 and 14, respectively, formed of platinum or the like. These ring pairs 13 and 14 are radially spaced and positioned at the outer and inner extremities, respectively, of the passage 11. The rings of each pair are axially spaced apart and parallel and occupy only a negligible portion of the passage 11. The outer rings 13 are conductively connected to the conductive coating on the chamber surface 12.

Bridging and secured to the inner perimeters of the two rings 14 is an annular metallic screen or mesh 18 which is convexly shaped inwardly, this screen 18 being broken away in FIG. 1 for clarity in showing the rings 14. This screen 18 conductively connects the two rings 14 together.

To the inner, annular perimeters of the two walls 9 and 10 are secured two frusto-conically shaped, stainless steel elements 16 and 17, respectively, which together constitute an anode electrode. These anode elements 16 and 17 are hollow as shown, and are segments in the preferred embodiment of this invention, of right angle cones. They are mounted with the smaller diameter ends 20 and 21, respectively, spaced apart and in juxtaposition, and they are otherwise coaxial about the axis 4.

The engagement between the two cones 16 and 17 and the walls 9 and 10 preferably is tight so as to prevent gas leakage therebetween, rings or brackets 22 serving to attach the cones to the walls 9 and 10. These rings 22 may be welded around the circumference thereof to the cones 16 and 17 and soldered to an evaporated coating of metal on the inner marginal edges of the walls 9 and 10. In any event, the attachment between the cones 16 and 17 should be secure and rigid such that the cones will be supported in position. Since the compartment member 5 supports the cones, it is necessary that this assembly be supported inside the envelope 1, and this preferably is accomplished by fusing the outer periphery of the exhaust chamber 6 to the inner surface of the envelope 1. So mounted, the cones 16 and 17 have the larger diameter ends 23 and 24 thereof, respectively, disposed opposite and in registry with the respective dynodes 2 and 3.

An inlet port 25 in the envelope 1 has a tubular fitting 26 for coupling to a vessel to be evacuated, the location of this inlet port 25 being close to the compartment member 5.

An exhaust tubulation 27 leads from the exhaust chamber 6 through the envelope 1 as shown and is hermetically sealed to the latter.

The anode cones 16 and 17 are electrically connected together by means of a wire or conductor 28. The two dynodes 2 and 3 are connected together by means of a conductor 29 which is grounded as shown.

Two metallic focusing rings 30 and 31 are positioned axially between the respective dynodes and anode cones 2, 16 and 3, 17, respectively, and are slightly larger in diameter than the anode cones 16, 17 but slightly smaller than the outer diameters of the dynodes 2 and 3. A plurality of circumferentially spaced metallic terminal rods or bars 32 which are affixed to the ring 30 and envelope 1 secure the ring 30 in place, whereas similar terminal rods or bars 33 secure the ring 31 in place. A conductor 34 connects the rings 30 and 31 together and to the negative side of a battery 35, the positive side thereof being connected to the dynodes 2 and 3 as shown.

A direct current power supply 36 has the negative terminal thereof grounded as shown and the high voltage, positive terminal connected to the conductor 28 through a suitable radio frequency inductor 37. A line 38 connects a lower voltage terminal of the supply 36 to the conductor 15 and rings 14, while another line 39 connects still a lower voltage terminal to the conductive coating on the surface 12 and also to the rings 13.

In one operating embodiment of the invention, the power supply 36 is designed to deliver from 10,000 to 12,000 volts with the line 38 being tapped off the supply at a position which delivers approximately 200 to 1,000 volts less. The line 39 is tapped off the supply at a position which will deliver approximately 200 to 1,000 volts less than the line 38. Thus, the two anode elements 16 and 17 may have in one example 10,000 volts connected thereto while the rings 14 will have a voltage of from 9,800 to 9,000 volts and the rings 13 will have a voltage of from 200 to 1,000 volts less than the voltage on the rings 14. The battery or supply 35 is designed to deliver a potential which is adjustable between the limits of minus 1,000 to plus 1,000 volts, respectively.

The operation of the invention will now be explained. With the dynodes 2 and 3 supplying copious quantities of electrons, a cloud of electrons oscillates through the tube a number of times until captured or intercepted by the anode 16, 17. With suitable potentials applied to all of the electrodes, the electrons emitted by the dynode surfaces 2 and 3 converge along essentially radial paths toward the center 40 of the tube, the focusing rings 30 and 31 having a potential applied thereto which produces this convergence. The anode element 16, the dynode 2 and the focusing ring 30 as well as the anode element 17, the dynode 3 and the focusing ring 31 constitute electron lenses which accelerate or focus electron emission from the dynodes toward the center 40. More generally, the potentials applied to the various electrodes as well as the physical dimensions and spacings thereof provide the electron-optical effect just noted. Typical calculations for determining these parameters may be found in my application, now abandoned, Serial No. 63,411 entitled "Electric Discharge Device for Producing Interactions Between Nuclei," filed October 18, 1960.

Electron flow is accelerated toward the anode 16, 17 by reason of the electric field established between the anode and the two dynodes 2 and 3 so that when the electrons reach the vicinity of the anode 16, 17 they are traveling at high velocity. Inasmuch as the anode 16, 17 is an essentially open structure, the anode itself may be considered to generate an equipotential, electron-permeable surface which exerts an accelerating force on the electrons emitted by the dynodes. Upon reaching the larger diameter portions 23, 24 of the anode, the electrons will have a velocity corresponding to the potential through which they have fallen and will thereupon travel onwardly along radial paths, toward the cross-over or center 40.

If at this point only a single electron is considered as existing in the space between the two dynodes 2 and 3, this electron will travel diametrically through the space as well as through the region between the smaller diameter ends 20 and 21 of the two anode elements 16 and 17. This region hereinafter will be referred to as the "anodic space" and, as already described, preferably is free of tangible structure. Because of the potential differential between the dynodes and the anode structure, the velocity of the electron will be affected correspondingly, but because of the fact that the potential inside the anodic space is uniform, that is to say constant throughout, the electron will experience no velocity-changing force while traveling therethrough. Thus, the electron, upon entering the tube, oscillates diametrically across the tube between the dynodes 2 and 3, the electron being considered as starting its travel adjacent to, for example, the dynode 2, accelerating toward the anode element 16, traveling with constant velocity through the anode and anodic space, and then decelerating from the anode element 17 to the dynode 3, the velocity of the electron just before reaching the dynode 3 being zero. This electron will continue its oscillatory travel until it is intercepted by the anode 16, 17, it being desired that the electron will make as great a number of trips as possible before being so lost.

The significance of this single-electron consideration is two-fold, the first recognizing that the normal space potential inside the anodic space surrounding the center 40 is uniform at the value of the anode potential, whereupon an electron traveling across the anodic space does so with uniform velocity and energy and the second being that the electron oscillates within the space of the two dynodes 2 and 3 a relatively large number of times before it is lost by anode interception.

As the next step in considering tube operation, let it be supposed that only two electrons simultaneously start movement from diametrically opposite points on the two dynodes 2 and 3, respectively. Both of these electrons will be propelled radially toward the exact center 40 of the anodic space so that these electrons will collide in the absence of any mutually repelling forces. Inasmuch as the two electrons are negatively charged particles, they will exert mutually repelling forces on each other the moment the anodic space is penetrated so that their respective velocities will progressively decrease until the electrons very nearly touch at the center 40. At this point, their respective velocities drop to zero. However, in a practical embodiment of this invention, the approach of the electrons is not "head-on," whereupon they pass each other at minimum velocity instead of stopping. Upon passing each other, the electrons are accelerated outwardly by the mutually repelling forces thereof. Upon leaving the anode elements 16 and 17, continued return movement results in the electrons losing velocity until they stop adjacent to the two dynodes 2 and 3, respectively, whereupon the cycle is repeated.

It may now be noted that, even though the unipotential space inside the anode elements 16 and 17 exerts no force on a single electron passing therethrough, two electrons approaching each other along a diametral path experience coulomb repulsion and velocity change, which serves to create an electric field in the anodic space. This may be thought of as a space charge effect.

Now assuming that a copious quantity of electrons emitted from the dynodes 2 and 3 permeate the anodes 16 and 17, such electrons will follow diametral paths which cross near the center 40. These electrons will converge toward the center 40 at progressively decreasing velocities until they reach a minimum velocity and thereafter diverge outwardly along essentially the same diameters, accelerating until they pass through the anode elements 16 and 17 and start approaching the dynodes 2 and 3. As the electrons pass through the anodic space surrounding the center 40, they contribute a negative charge to this space so as to decrease progressively the space potential as the center 40 is approached. Thus, at the anodic center a virtual cathode will be produced which can be made to have a potential essentially the same as that of the dynodes 2 and 3. The space current generated as just explained oscillates back and forth through the permeable anode since it does not re-enter the dynode from which it was emitted. The circulating space current thus builds up to values much higher than the anode current, because the permeance of the anode as well as the electron optics allow the interception of only a very small fraction of the space current.

Figure 2:
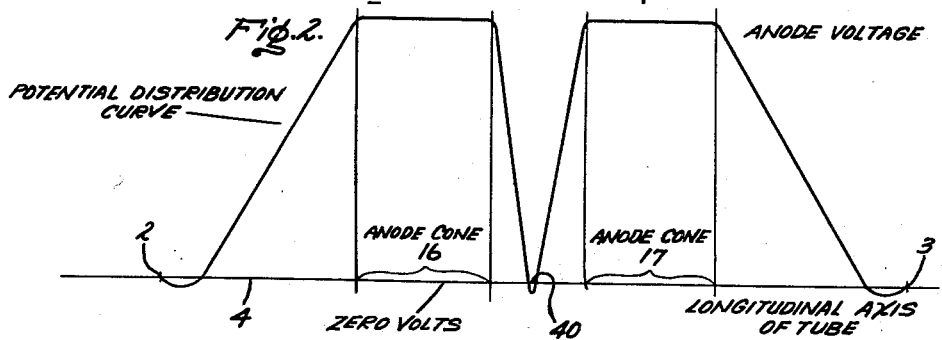
FIG. 2 is a potential distribution curve used in explaining the operation of the embodiment of FIG. 1.

The establishment of the space charge in the anodic space may be better understood by reference to the graph of FIG. 2 wherein the abscissa represents the longitudinal axis of the tube and the ordinate represents the potential distribution inside the tube.

This potential distribution across the longitudinal axis of the tube due to copious quantities of electrons starts from zero at the respective dynodes 2 and 3, decreases slightly and then increases toward the anode potential. Inside the respective anode elements 16 and 17, the potential remains substantially constant while inside the anodic space between the two anode elements 16 and 17 the distribution diminishes to nearly zero at the center 40. This potential distribution in a region closely adjacent the center 40 has spherical symmetry but outwardly thereof it varies elliptically with the major axis or axes of the equipotential ellipses coinciding with the minor axis 41 of the tube (FIG. 4). The equipotential surfaces farther outwardly from the center 40 vary according to the lines indicated generally by the reference numeral 42 in FIG. 4.

For purposes of explaining the operation of the invention, an inner spherical field 43 is indicated in FIG. 4 as are the elliptical fields by the numeral 44. The significance of the particular shape of these fields will become apparent from the following description.

It will now be apreciated that it is possible without any physical means other than the space current flow to produce a nonuniform potential distribution in a space enclosed by a permeable equipotential element or surface (anode 16, 17).

In the next phase of operation, let it be assumed that a conventional vacuum pump is connected to the exhaust fitting 27 and a vessel to be evacuated is coupled to the inlet fitting 26. The vacuum pump coupled to the exhaust fitting 27 is operated to reduce the pressure inside the envelope 1 and also inside the vessel to be evacuated to a pressure of from $10^{-2}$ to $10^{-4}$ millimeters of mercury. The operation as just explained in connection with the establishment of a potential distribution in the anodic space takes place such that the next step to be considered in the operation of the tube is the further reduction of the pressure in the vessel being evacuated.

Since the gases in the vessel being evacuated flow into the envelope 1 when the tube of this invention reduces the pressure, it will only be necessary in the following to consider what happens in the tube.

As gas atoms diffuse into the tube and also into the anode 16, 17 and the anodic space, collision of the electrons with the neutral atoms results in positive ion formation. As has already been explained, there exists a potential distribution in the anodic space of nearly zero potential at the center 40 and maximum positive potential at the surface 42 adjacent the inner ends 20 and 21 of the anode elements. Thus the positive ions will be attracted toward the center 40 and will attain the maximum velocity corresponding to the potential through which they fall in passing from the point where they are born to the center 40. FIG. 5 is a cross-sectional illustration of that portion of the anodic space inside the sphere 43, with the character of ion concentration being indicated by stippling.

If it is assumed that an ion is born or created in that part of the anodic space where the potential difference with respect to the center 40 is 5-kilovolts, then the ion will be attracted toward the center. In its flight toward the center, the ion will gain sufficient momentum to carry it beyond the center, after which the flight will diminish in velocity until the ion reaches a point in space which again has a potential difference with respect to the center 40 of about 5-kilovolts. The ion will there experience a force of repulsion which will cause it to return toward and through the center again. From this it will be seen that an ion born in the anodic space having a potential positive with respect to the center 40 will oscillate along approximately radial paths through the center 40, the length of the oscillating path being determined by the space potential at which the ion was born.

The ions born in the regions adjacent the ends 20 and 21 of the anode elements will fly toward the zero potential center 40 with extremely high acceleration and velocity and will travel through along a diametral path to the opposite point of the anodic space until the original energy level is attained. Then they return toward the center and repeat this oscillator transit the same as those ions born near the center. This ion movement is graphically illustrated by means of double-ended arrows in FIGS. 4 and 5 wherein the arrow 45 indicates the oscillatory path followed by an ion born near the anode ends 20 and 21, or in other words near the surfaces 42, the arrow 46 indicating the oscillatory path followed by an ion born closer to the center and lastly the arrow 47 (see FIG. 5) indicating the oscillatory path followed by ions born adjacent the center 40. All of these ions, since they pass through the center, contribute to the high ion-density which develops therein. The space of heavy ion concentration can have a radius as small as one-millimeter.

Certain of the slowly moving ions will recombine with an electron near the center 40 and thereby reduce to a neutral atom which experiences no force of movement. Such atoms will tend to drift outwardly and either will be reionized with probability of reappearance as ions of higher energy or will escape from the anodic space and be lost. If they are lost in the direction of the exhaust tube 27 (FIG. 1), they will be scavenged by the rough pump. Particle concentration inside the anodic space and more especially inside the spherical field bounded by the surface 43 is graphically illustrated by the curves of FIG. 5, the ion density being represented by the two curves 48.

As has already been explained, the high energy ion will oscillate radially through the anodic space. This oscillatory action will continue until one of two possibilities occurs: (1) the ion path is changed by the "scattering process"; or (2) the ion "captures" an electron and becomes a neutral atom.

By "scattering process" is meant the effect of repulsion experienced by two like particles such as ions approaching each other from different directions. For example, assuming that one ion is stationary at the center 40 and another ion is traveling radially inwardly toward this central ion, as the traveling ion approaches the center, it will experience a coulomb force of repulsion which will tend to set the central ion into motion and to reduce the velocity of the incident ion. Thus an energy transfer occurs from the moving ion to the stationary ion, which tends to slow down the moving ion. The net effect is that instead of a fast ion and one at rest, two ions of intermediate velocities are produced.

In the case of "capture," an ion gains an electron from a neutral atom which becomes an ion of lower energy than the original ion. This leaves the total number of ions unchanged. The ion must then be accelerated to a higher energy as in the case mentioned above.

Considering more specifically the behavior of the ions as depicted by FIG. 4, those ions traveling along the diametral paths indicated by the double-ended arrow 45 will, of course, penetrate the equipotential surfaces represented by the numeral 43, and when by the scattering process an ion is deflected from this diametral path 45 into a direction more nearly along the minor axis 41 of the tube, this ion will not encounter an equipotential surface which will repel it toward the center but instead will be transported outwardly under the influence of the electric fields created by the ion-accelerating rings 13 and 14. Once the ion comes under the influence of the fields set up by these rings 13 and 14, they will be transported radially outwardly through the annular passage 11 and into the exhaust chamber 6 from which they will pass outwardly through the exhaust tube 27. They are scavenged from the chamber 6 by the rough pump which is connected to the exhaust tube 27. Thus, as will now appear, the higher energy ions as they are deflected by the scattering process eventually will find their way outwardly of the anodic space and into the attracting field of the ion-accelerating rings 13 and 14.

By reason of the potential difference applied between the rings 13 and 14 and the fact that the inner surfaces of the walls 7 and 8 are nonconductive or perhaps only negligibly conductive, ions entering the passage 11 will be transported by the field from the rings 14 toward the field from rings 13 and into the exhaust chamber 6, inasmuch as the chamber 6 has a conductive coating on the inner surface 12 which is at the same potential as the rings 13. As more clearly shown in FIG. 1, the chamber 6 is preferably circular in cross-section such that ions which become neutralized upon striking the conductive coating on the surface 12 will be scattered or otherwise diffused in the chamber and thereby will not likely pass backwardly through the passage 11.

At this point it may be mentioned that while the screen 18 is shown as being used, this screen may be omitted without seriously affecting the tube operation. It is preferable, however, to use this screen inasmuch as it provides an equipotential surface which tends to direct ion flow toward and into the passage 11.

As already stated, the higher energy ions as they are deflected by the scattering process eventually find their way outwardly of the anodic space and into the exhaust chamber 6.

By the same token, the lower energy ions represented by the arrows 46 and 47 (FIG. 4) will never develop enough energy to escape from the anodic space; however, their presence is essential inasmuch as they provide the necessary ion concentration in the center for deflecting the high energy ions as already explained. In the operation of the tube, the proper balance between high energy and low energy ions is necessary in order to assure proper operation, this proper balance being achieved by adjusting the various voltages applied to the various electrodes, particularly the voltages applied to the rings 13 and 14 by adjustment of the respective leads 39 and 38 on the battery 36 so as to optimize the pumping rate.

Any neutral atoms in the anodic space are, of course, subject to collision with an ion, and in this event the neutral atom will have imparted thereto a motion which is transferred from the moving ion. If this motion is in a direction along the minor axis 41 of the tube, the atom, of course, will be scavenged from the exhaust tube 27 by the rough pump.

The potential distribution curve of FIG. 3 graphically illustrates the forces which are exerted on the ions which find their way into the passage 11, or in other words into the field of the ion rings 13 and 14. Any ion which overcomes the positive potential barrier indicated by the reference numeral 49 (and corresponding to the potential surface 44) will be attracted toward the screen 18 and ion rings 14, because they are more negative than the equipotential surfaces of the anodic space.

Then, since the rings 13 are more negative than the rings 14, the ions will be attracted outwardly through the annular passage 11 until they enter the exhaust chamber 6. They are then scavenged from the exhaust chamber 6 by means of the rough pump connected to the exhaust fitting 27. While the use of the annular passage 11 is preferred, communication between exhaust chamber 6 and the center of the tube may be provided by several radiating tubes, resembling the spokes of a wheel, which surround the anodic space, this alternative arrangement being regarded as being within the scope of the invention.

Thus far, only that gas which becomes ionized and enters the anodic space between the anode ends 20 and 21 has been considered, leaving for further consideration that gas which is ionized in the space between the respective dynodes 2 and 3 and the anode elements 16 and 17. Any ion created, for example, between the anode element 17 and the dynode 3 will be attracted toward the dynode 3, and if the dynode is made of a material which adsorbs the ion, it will be lost on the dynode and thereby effectively scavenged from the tube.

As has now been shown, the tube of this invention continuously operates as a vacuum pump, and because of the ion and electron interactions, pressures of infinitesimally low values may be achieved.

Inasmuch as the tube is composed essentially of an anode and two dynodes on the opposite sides of the anode, it can operate and preferably does operate as a multipactor. The principles of multipacting, or in other words electron multiplication, are well understood, typical examples of multipactors and the theories of operation being disclosed in my Patents Nos. 2,071,515 and 2,071,516. If an electron in its transit between the two dynodes 2 and 3 is accelerated to a value sufficient to cause it to impact one of the dynodes, secondary electrons will be emitted. It is therefore desirable that the dynodes 2 and 3 be formed of material having a secondary emission ratio of greater than unity such that each impact of an electron therewith will produce a plurality of secondaries. The buildup of electron current is thus multiplied until an equilibrium value of circulatory current is reached. By means of multipacting, the potential distribution inside the anodic space may be maintained in proper balance to the space charge produced by the ionic concentration. In one mode of operation, multipacting is assured by the application of a radio frequency voltage to the coil 37, the amplitude and frequency of this voltage depending upon the electron transit time between dynodes as explained in my aforesaid patents.

If the circulatory electron current is generated, as previously described, by means other than multipacting, the number of neutral atoms may drop to such a low figure that an insufficient number of ions will be produced to sustain the pumping action. This lack of pumping can be overcome by operating the tube as a multipactor as just described or by using a cold cathode emitter, such as tungsten rhenium, in conjunction with the dynodes 2 and 3 for building the electron current to sufficiently high values which assure pumping action. By using a high value of electron current, the relatively few neutral atoms have a higher probability of being ionized than would be true for a relatively lower value.

By operating the tube as a multipactor, this high value of electron current is assured. In operating as a multipactor, the voltage applied to the anode 16, 17, the spacing between dynodes 2 and 3 and the frequency of the radio frequency voltage applied to the coil 37 are all properly related such that the electrons oscillating between the dynodes will multiply. The frequency of the radio frequency voltage is adjusted to a value at which a full period is approximately equal to electron transit time between dynodes with a given voltage applied to the anode 16, 17.

This relationship is best understood by considering tube operation without the radio frequency voltage applied. Electrons initially released from dynode 2 will be accelerated toward and through anode 16, 17 and by reason of the focusing field already explained, these electrons will be guided through center 40 and onward to the dynode 3. During flight, they are accelerated up to the time they reach the anode 16, 17, while from this point on they are decelerated until they reach the dynode 3 with zero velocity.

Now considering the affect of the applied radio frequency voltage, the electrons approaching dynode 3 will not arrive with zero velocity but instead will have a finite velocity which causes electron impact and release of secondaries. During the time of flight between dynode 2 and dynode 3, the radio frequency voltage swings the anode 16, 17 alternately positively and negatively with respect to these dynodes. If it is considered that an electron is emitted by dynode 2 at the instant a positive half-cycle of radio frequency voltage starts, the anode 16, 17 during the half-cycle accelerates the electron over and above that acceleration due to the direct current potential applied by the battery 36. Thus, at the end of the positive half-cycle of radio frequency voltage, the electron arrives at the center 40 with a higher velocity than would be the case without the radio frequency. As the electron continues its transit toward the dynode 3, passing through the anode cone 17, the radio frequency voltage on the anode 16, 17 passes through the negative half-cycle. The electron thereupon receives less deceleration from the anode 16, 17 than it experienced in acceleration during the first half period, whereupon the electron arrives at the dynode 3 with a finite velocity. On the return trip, either this primary electron or the secondaries which are knocked off experience the same accelerating and decelerating forces whereupon these electrons arrive at the dynode 2 with a finite velocity sufficient to knock off secondaries. Thus, the transits of the electrons repeat, thereby building up the total electron current. On the other hand, if the electron density rises too high, the space charge developing in front of the dynodes will repel some secondaries, thus in effect reducing the secondary emission yield. Therefore, the total electron current finally reaches an equilibrium value at which electron interception by the anode 16, 17 just equals the generation of electrons by the dynodes. As a result of this multiplication, adequate electron current for proper operation is assured.

While I have described above the principles of my invention in connection with specific apparatus, it is to be clearly understood that this description is made by way of example and not as a limitation to the scope of my invention.

What is claimed is:

1. A vacuum pump comprising means for establishing in an inner region of space free of tangible structure a potential distribution which is a minimum in the central portion thereof and a maximum on a potential surface surrounding and enclosing said central portion, second means for establishing a second potential distribution in an outer region free of tangible structure surrounding and contiguous with said surface, said second potential distribution progressively diminishing radially outwardly from said surface to a predetermined low value, and means for scavenging ions from the outer region of said second potential distribution.

2. A vacuum pump comprising means for establishing in an inner region of space free of tangible structure a potential distribution which is a minimum in the central portion thereof and a maximum on a potential surface surrounding and enclosing said central portion, second means for establishing in an outer region of space contiguously surrounding said inner region a second potential distribution which progressively diminishes radially outwardly from said surface to a predetermined value intermediate said minimum and maximum potentials, said outer region being free of tangible structure, and means for scavenging ions from said outer region.

3. A vacuum pump comprising first electrode means for establishing a virtual cathode in a region of space free of tangible structure, second electrode means surrounding said region and defining an annular chamber into which ions may enter, said second electrode means having a potential applied thereto which attracts said ions, and means for scavenging ions from said chamber.

4. A vacuum pump comprising an anode having an open region free of tangible structure, means including said anode for establishing a virtual cathode in said region, means for supplying a predetermined potential to said anode, an ion-accelerating electrode disposed adjacent to said region for removing ions therefrom, means for supplying a potential of predetermined lesser amount than the first-mentioned potential to said electrode, and means for preventing ions attracted by said electrode from re-entering said region.

5. A vacuum pump comprising an anode having an open region free of tangible structure, electron-optical means including said anode for generating and focusing electrons toward a common point in said region whereby a space charge is produced which is of minimum potential at said point and a maximum potential at a surface surrounding and spaced from said point, ion-accelerating means for establishing a potential distribution in a second region surrounding said open region which diminishes progressively from a maximum at said surface to a predetermined lower value at a location spaced radially outwardly from said surface, and means for scavenging ions from said second region.

6. A vacuum pump comprising an anode having two elements spaced apart and provided with apertures, respectively, said apertures being in registry with each other, the space between said elements being free of tangible structure, two cathodes disposed opposite said elements respectively on the sides remote from said space, means including said cathodes and said elements for focusing electrons toward a point in said space whereby a potential distribution is developed in said space which is a minimum at said point and a maximum at a surface spaced outwardly from and surrounding said point, an ion-accelerating electrode disposed between said elements and surrounding said space in spaced relation therewith, said electrode defining a chamber into which gaseous particles may enter, and circuit means for applying a common potential to said anode elements, a predetermined lesser potential to said electrode and a reference potential to said cathodes.

7. A vacuum pump comprising an anode having two frusto-conically shaped tubular elements mounted symmetrically about a common axis, said elements having the smaller diameter ends thereof spaced apart and facing each other for defining a region therebetween which is free of tangible structure, two cathodes positioned opposite the larger diameter ends of said elements respectively, electron-optical means including said elements and said cathodes for focusing electrons toward a point in said region, two ion-accelerating rings interposed between said anode elements and surrounding said region, said rings being radially spaced from said region and also spaced apart with respect to each other to define a chamber therebetween, said anode elements being electrically connected together and said rings also being electrically connected together, and means for scavenging gaseous particles from said chamber.

8. A vacuum pump comprising an anode having two frusto-conically shaped tubular elements mounted symmetrically about a common axis, said elements having the smaller diameter ends thereof spaced apart and facing each other for defining a region therebetween which is free of tangible structure, two cathodes positioned opposite the larger diameter ends of said elements respectively, electron-optical means including said elements and said cathodes for focusing electrons toward a point in said region, two ion-accelerating rings interposed between said anode elements and surrounding said region, said rings being radially spaced from said region and also spaced apart with respect to each other to define a chamber therebetween, said anode elements being electrically connected together and said rings also being electrically connected together, and an envelope enclosing said cathodes, said anode and said rings, said envelope having an inlet port for connection to a vessel to be evacuated and an exhaust tube communicating with said chamber.

9. A vacuum pump comprising an envelope, an annular compartment member mounted in said envelope and having opposite spaced apart sides, an exhaust tube secured at one end to the outer peripheral portion of said member and passing through said envelope, two hollow anode elements of frusto-conical shape mounted in said compartment member with the smaller diameter apertures thereof being spaced apart and facing each other, said anode elements being coaxially disposed about a common axis with the larger diameter openings thereof facing oppositely outwardly, said compartment member surrounding the space between said anode elements, a pair of spaced apart cathodes mounted in said envelope and facing said larger openings respectively, said cathodes being spherically concave facing said larger openings and symmetrically shaped with respect to said axis, said cathodes and said anode elements constituting an electron-optical lens for focusing electrons toward a point disposed between said smaller apertures, an ion-attracting electrode insulated from said anode elements and mounted in said compartment member, said electrode surrounding in radially spaced relation the space between said anode elements, said envelope having an inlet port, said anode elements being electrically connected together, and said cathodes being electrically connected together.

10. A vacuum pump comprising an envelope, an annular compartment member mounted in said envelope and having opposite spaced apart sides, an exhaust tube secured at one end to the outer peripheral portion of said member and passing through said envelope, two hollow anode elements of frusto-conical shape mounted in said compartment member with the smaller diameter apertures thereof being spaced apart and facing each other, said anode elements being coaxially disposed about a common axis with the larger diameter openings thereof facing oppositely outwardly, said compartment member surrounding the space between said anode elements, a pair of spaced apart cathodes mounted in said envelope and facing said larger openings respectively, said cathodes being spherically concave facing said larger openings and symmetrically shaped with respect to said axis, two focusing rings fixedly mounted inside said envelope and coaxial with respect to said axis, one each of said focusing rings being interposed between each cathode and the adjacent anode element, means including said cathodes, said focusing rings and said anode elements for forming an electron-optical lens for focusing electrons toward a point disposed between said smaller apertures, an annular metallic electrode fixedly mounted inside said compartment member and coaxial with respect to said axis, said annular electrode surrounding in radially spaced relation the space between and being electrically insulated from said anode elements, said compartment member being divided into an exhaust chamber and an annular passage, said annular passage being interposed radially between said exhaust chamber and the space between said anode elements, said annular electrode being disposed in said passage, said envelope having an inlet port, said anode elements being electrically connected together, and said cathodes being electrically connected together.

11. A vacuum pump comprising an envelope, an annular compartment member mounted in said envelope and having opposite spaced apart sides, an exhaust tube secured at one end to the outer peripheral portion of said member and passing through said envelope, two hollow anode elements of frusto-conical shape mounted in said compartment member with the smaller diameter apertures thereof being spaced apart and facing each other, said anode elements being symmetrically disposed about a common axis with the larger diameter openings thereof facing oppositely outwardly, said compartment member surrounding the space between said anode elements, a pair of spaced apart cathodes mounted in said envelope and facing said larger openings respectively, said cathodes being spherically concave facing said larger openings and symmetrically shaped with respect to said axis, two focusing rings fixedly mounted inside said envelope and coaxial with respect to said axis, one each of said focusing rings being interposed between each cathode and the adjacent anode element, means including said cathodes, said focusing rings and said anode elements for forming an electron-optical lens for focusing electrons toward a point disposed between said smaller apertures, said compartment member being divided into an exhaust chamber and an annular passage, said annular passage being interposed radially between said exhaust chamber and the space between said anode elements, a first annular metallic electrode fixedly mounted in said passage and coaxial with respect to said axis, said annular electrode surrounding in radially spaced relation the space between and being electrically insulated from said anode elements, a second annular metallic electrode fixedly mounted in said compartment in a position radially between said first electrode and said exhaust chamber, said first and second electrodes being insulated from each other, said envelope having an inlet port, said anode elements being electrically connected together, and said cathodes being electrically connected together.

12. A vacuum pump comprising an envelope, an annular compartment member mounted in said envelope and having opposite spaced apart sides, an exhaust tube secured at one end to the outer peripheral portion of said member and passing through said envelope, two hollow anode elements of frusto-conical shape mounted in said compartment member with the smaller diameter apertures thereof being spaced apart and facing each other, said anode elements being symmetrically disposed about a common axis with the larger diameter openings thereof facing oppositely outwardly, an outer peripheral portion of each anode element being sealed to the inner perimetric portion of a respective one of said component member sides, said compartment member surrounding the space between said anode elements, a pair of spaced apart cathodes mounted in said envelope and facing said larger openings respectively, said cathodes being spherically concave facing said larger openings and symmetrically shaped with respect to said axis, said cathode and said anode elements constituting an electron-optical lens for focusing electrons toward a point disposed between said smaller apertures, an ion-transporting electrode insulated from said anode elements and mounted in said compartment member, said electrode surrounding in radially spaced relation the space between said anode elements, said envelope having an inlet port, said anode elements being electrically connected together, and said cathodes being electrically connected together.

13. A vacuum pump comprising an envelope, an annular compartment member mounted in said envelope and having opposite spaced apart sides, an exhaust tube secured at one end to the outer peripheral portion of said member and passing through said envelope, two hollow anode elements of frusto-conical shape mounted in said compartment member with the smaller diameter apertures thereof being spaced apart and facing each other, said anode elements being symmetrically disposed about a common axis with the larger diameter openings thereof facing oppositely outwardly, an outer peripheral portion of each anode element being sealed to the inner perimetral portion of a respective one of said compartment member sides, said compartment member surrounding the space between said anode elements, a pair of spaced apart cathodes mounted in said envelope and facing said larger openings respectively, said cathodes being spherically concave facing said larger openings and symmetrically shaped with respect to said axis, two focusing rings fixedly mounted inside said envelope and coaxial with respect to said axis, one each of said focusing rings being interposed between each cathode and the adjacent anode element, means including said cathodes, said focusing rings and said anode elements for forming an electron-optical lens for focusing electrons toward a point disposed between said smaller apertures, said compartment member being divided into an exhaust chamber and an annular passage, said annular passage being interposed radially between said exhaust chamber and the space between said anode elements, a first annular metallic electrode fixedly mounted in said passage and coaxial with respect to said axis, said annular electrode surrounding in radially spaced relation the space between and being electrically insulated from said anode elements, a second annular metallic electrode fixedly mounted in said compartment in a position radially between said first electrode and said exhaust chamber, said first and second electrodes being insulated from each other, said envelope having an inlet port, said anode elements being electrically connected together, and said cathodes being electrically connected together, a source of undirectional potential having positive and negative terminals which are connected respectively to said anode elements and said cathodes, and an inductor connected between said anode elements and said cathode in series with said source.

14. The vacuum pump of claim 13, wherein said first annular electrode comprises two rings axially spaced apart and secured to the sides, respectively, of said compartment member, said second annular electrode comprises two rings disposed in said passage which are axially spaced apart and secured to the sides, respectively, of said compartment member, and said exhaust chamber has a conductive coating on the surface thereof which is electrically connected to said second electrode.

15. A vacuum pump comprising an anode having two elements spaced apart and provided with two apertures, respectively, said apertures being in registry with each other, the space between said elements being free of tangible structure, two cathodes disposed opposite said elements respectively on the sides remote from said space, means including said cathodes and said elements for focusing electrons toward a point in said space whereby a potential distribution is developed in said space which is a minimum at said point and a maximum at a surface spaced outwardly from said point, ion-transporting means disposed between said elements and surrounding said space in spaced relation therewith, said ion-transporting means defining a chamber into which gaseous particles may enter, circuit means for applying a common potential to said anode elements, a predetermined lesser potential to said ion-transporting means and a reference potential to said cathodes, and second circuit means coupled to said cathodes for producing greater than unity electron emission therefrom.

16. A vacuum pump comprising an anode having two frusto-conically shaped tubular elements mounted symmetrically about a common axis, said elements having the smaller diameter ends thereof spaced apart and facing each other for defining a region therebetween which is free of tangible structure, two cathodes positioned opposite the larger diameter ends of said elements respectively, electron-optical means including said elements and said cathodes for focusing electrons toward a point in said region, ion-transporting means interposed between said anode elements and surrounding said region, said ion-transporting means being radially spaced from said region and defining a chamber, said anode elements being electrically connected together, means for scavenging gaseous particles from said chamber, means for applying a common potential to said tubular elements, a predetermined lesser potential to said ion-transporting means and a reference potential to said cathodes, and circuit means for developing an alternating potential between said cathodes for multiplying the emission of electrons therefrom.

References Cited by the Examiner

UNITED STATES PATENTS 2,454,564  11/48  Nelson _____ 315—111

GEORGE N. WESTBY, *Primary Examiner.*